United States Patent [19]

Pederson

[11] Patent Number: 5,234,109
[45] Date of Patent: * Aug. 10, 1993

[54] APPARATUS AND METHOD FOR SEPARATING RECYCLABLE WASTE

[76] Inventor: Dennis A. Pederson, 234 - 58th Pl., Des Moines, Iowa 50312

[*] Notice: The portion of the term of this patent subsequent to Oct. 5, 2009 has been disclaimed.

[21] Appl. No.: 843,352

[22] Filed: Feb. 27, 1992

Related U.S. Application Data

[62] Division of Ser. No. 649,744, Feb. 1, 1991, Pat. No. 5,116,486.

[51] Int. Cl.⁵ ................................ B07B 9/00
[52] U.S. Cl. ........................ 209/12; 209/33; 209/38; 209/44.2; 209/630; 209/675; 209/930
[58] Field of Search .................... 209/12, 32, 33, 38, 209/39, 44.1, 44.2, 219, 629, 630, 675, 702, 930

[56] References Cited

U.S. PATENT DOCUMENTS

| | | |
|---|---|---|
| 760,832 | 5/1904 | Williamson ................ 209/33 X |
| 1,229,542 | 6/1917 | Stewart et al. ............ 209/33 X |
| 3,973,736 | 8/1976 | Nilsson ..................... 209/12 X |
| 4,387,019 | 6/1983 | Dale et al. ................ 209/930 X |
| 4,693,379 | 9/1987 | Stehle ....................... 209/930 X |
| 4,778,061 | 10/1988 | Williams .................. 209/930 X |
| 4,929,342 | 5/1990 | Johnson ................... 209/930 X |
| 5,060,870 | 10/1991 | Trezek et al. ............ 209/930 X |
| 5,101,977 | 4/1992 | Roman ..................... 209/38 X |
| 5,116,486 | 5/1992 | Pederson .................. 209/930 X |

FOREIGN PATENT DOCUMENTS

| | | | |
|---|---|---|---|
| 0191691 | 8/1986 | European Pat. Off. ........... 209/930 |
| 2539055 | 7/1984 | France .......................... 209/930 |
| 0016878 | 2/1977 | Japan ............................. 209/12 |

Primary Examiner—Andres Kashnikow
Assistant Examiner—Joseph A. Kaufman
Attorney, Agent, or Firm—Zarley, McKee, Thomte, Voorhees & Sease

[57] ABSTRACT

An apparatus for recycling waste materials includes a first conveyor for conveying a combination of waste material including magnetic responsive metals, magnetic non-responsive metals, glass materials in both large and small particles, and plastics. A magnetic separator is positioned to receive the waste materials from the first conveyor and is capable of removing the magnetic responsive metals. A vibrating shaker screen then receives the waste materials and by virtue of its vibration causes the smaller broken glass to pass through spaces in the screen. Next, an air sorter including a large blower receives the waste materials and blows a stream of air across the waste materials so as to blow the lighter metals, such as aluminum and the plastics away from the remaining large glass materials, such as bottles. The glass bottles are carried away on a second conveyor, and the aluminum and plastics are carried away on a third conveyor.

4 Claims, 3 Drawing Sheets

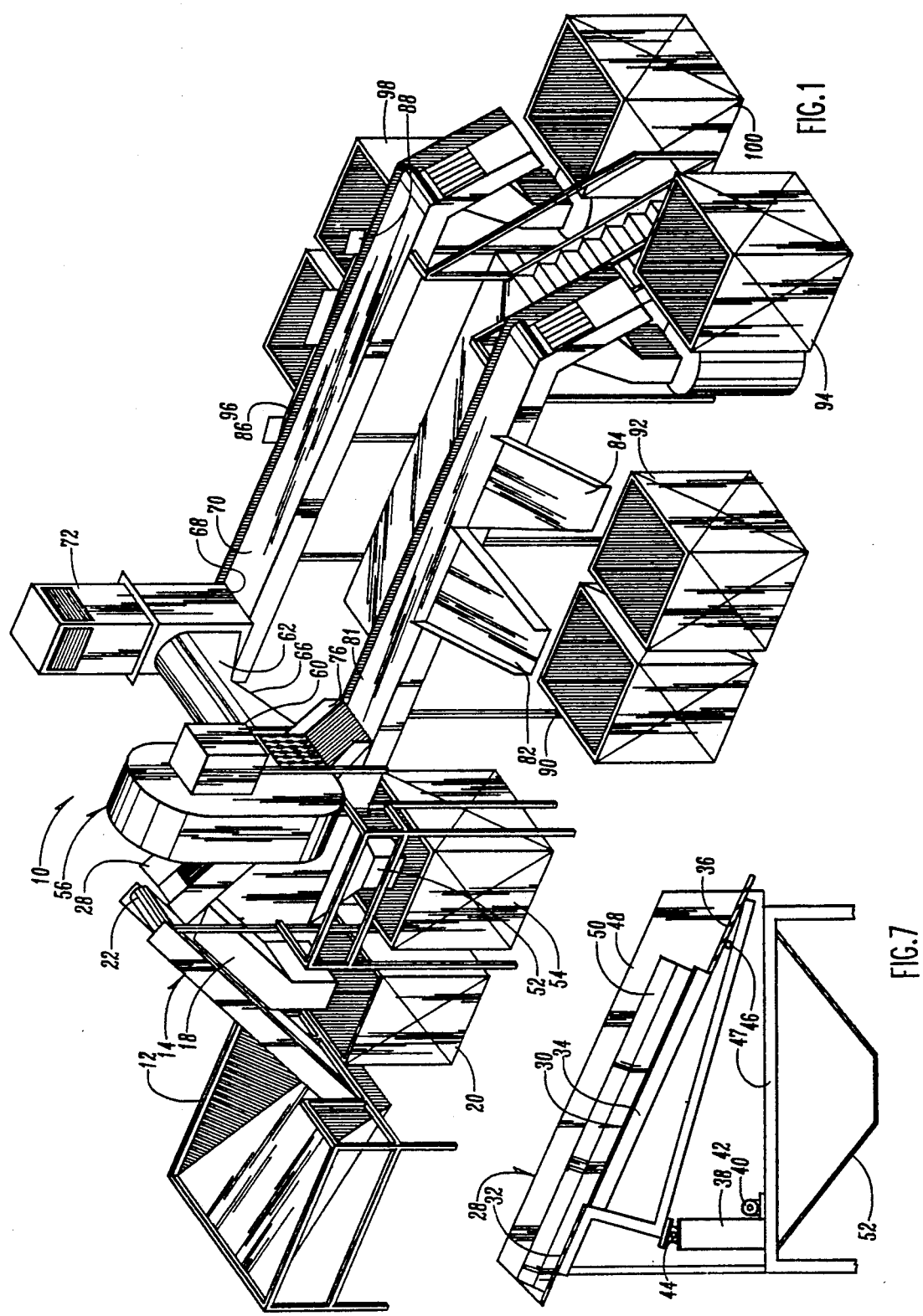

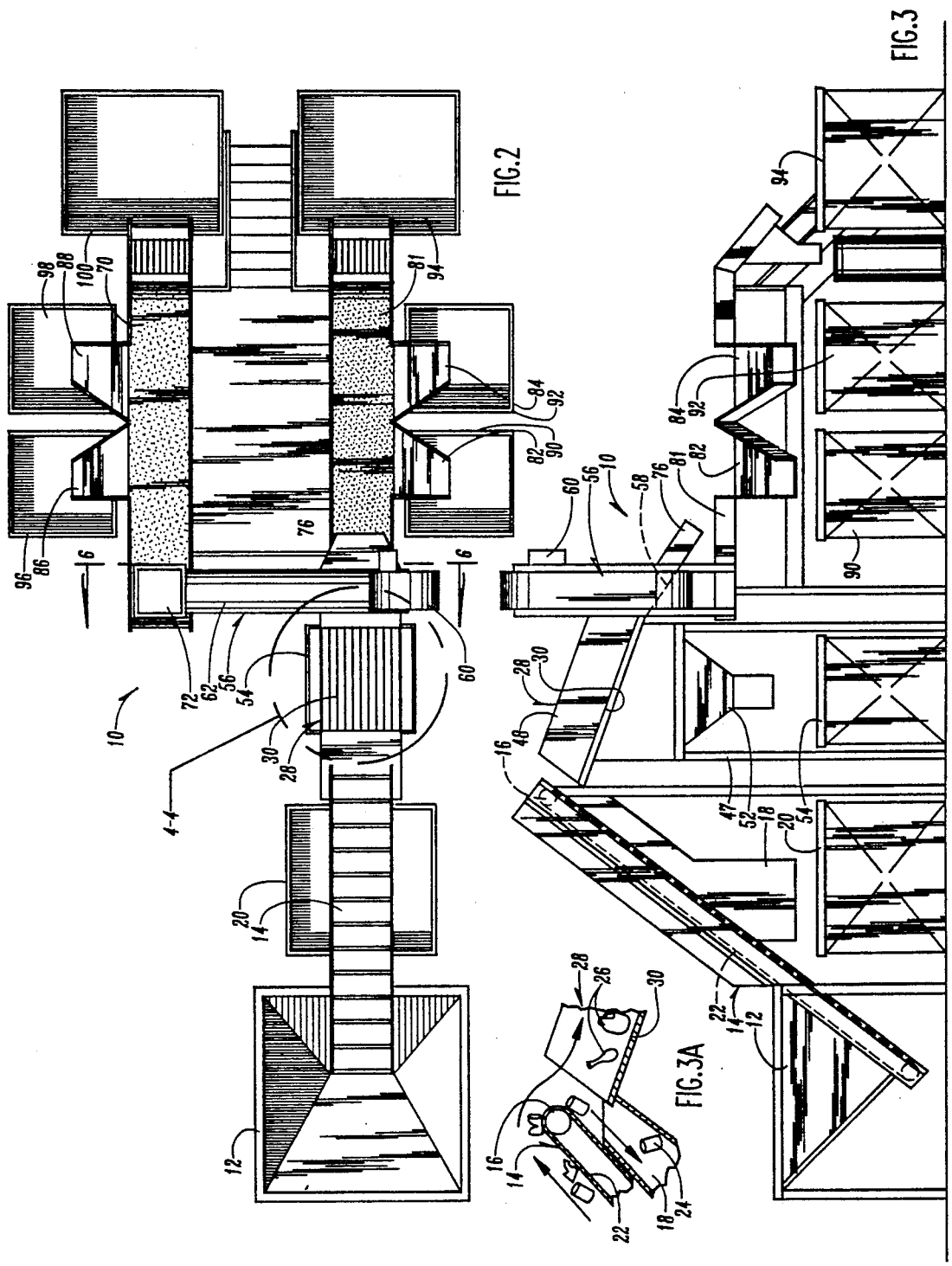

APPARATUS AND METHOD FOR SEPARATING RECYCLABLE WASTE

This is a divisional application of application Ser. No. 07/649,744, filed Feb. 1, 1991 now U.S. Pat. No. 5,116,486.

BACKGROUND OF THE INVENTION

The present invention relates to an apparatus and method for separating recyclable waste. Specifically, the present invention relates to a method and apparatus for separating recyclable waste which includes magnetic responsive metals, magnetic non-responsive metals, glass materials in both large and small particles, and plastics.

The first step in recycling materials such as described above is to separate the various types of materials into homogenious groups. The magnetic responsive metals include such things as tin cans or other materials. Other magnetic non-responsive metals, such as aluminum cans, are also included in most waste materials. Glass may be present either in complete containers or bottles, or in small broken pieces of various sizes. Also, various forms of plastic, such as plastic containers, bottles, or other plastic materials are also present.

Therefore, a primary object of the present invention is the provision of an improved apparatus and method for separating recyclable waste materials.

A further object of the present invention is the provision of an improved apparatus and method which permits the separation of various recyclable materials automatically, or at least minimizes human participation in the separating process.

A further object of the present invention is the provision of an improved method and apparatus for recycling waste materials which is economical and simple.

A further object of the present invention is the provision of an improved apparatus and method for separating recyclable materials which offers ease of maintenance.

A further object of the present invention is the provision of an improved apparatus and method for separating recyclable materials which permits the broken glass and smaller particles to be separated from the larger particles of waste.

A further object of the present invention is the provision of an improved apparatus and method which permits the separation of lighter weight materials, such as the plastics and the aluminum cans from the heavier weight materials by means of a blower system.

A further object of the present invention is the provision of an apparatus and method which permits negative sorting of the plastic, aluminum, and glass materials. A further object of the present invention is the provision of an apparatus and method which is efficient in operation, durable in use, and economical to manufacture.

SUMMARY OF THE INVENTION

The present invention utilizes a first conveyor for conveying the combined waste materials from an initial hopper. The first conveyor includes a magnetic pulley at one of its ends. Other type of magnetic separators, such as overhead magnets may be used. As the waste materials are carried over the discharge end of the conveyor, the magnetic responsive metals continue to adhere to the magnetic roller through the conveyor belt, and pass around the end of the belt and begin reversing their direction. The remaining materials are discharge from the end of the belt into a second stage of separation. Thus, the magnetic pulley permits the magnetic responsive materials to be separated from the remaining refuse materials.

In the second stage of separation, the waste materials are passed over a vibrating grate or screen having elongated bars spaced apart a predetermined distance. The vibration of the screen causes the smaller particles to fall through the spaces between the bars, and thereby be separated from the remainder of the waste materials. The bars are slightly wider apart at their discharge end than at the input end so that waste materials do not tend to become stuck or wedged between the bars.

After the waste material leaves the shaker bars, it is introduced to an elongated slide having a blower which blows a stream of air across the refuse in a direction transverse to the direction of movement of the refuse. The blower causes the lighter materials, such as the plastics and the aluminum to be blown away from the heavier objects, such as glass, which remain in the waste materials. The lighter objects are directed through a tunnel and are discharged onto a second conveyor. This second conveyor is an elongated belt conveyor, and manual sorting can take place along this conveyor to separate the plastics and the lighter weight metals from one another.

Meanwhile, the heavier glass materials, such as bottles and the like pass through the blower and are deposited upon a third conveyor. Manual sorting can occur on this third conveyor to separate the bottles of different colored glass from one another so that they can be placed in separate bins.

BRIEF DESCRIPTION OF THE DRAWINGS

FIG. 1 is a perspective view of the system of the present invention for separating the waste materials.

FIG. 2 is a top plan view thereof.

FIG. 3 is a front elevational view thereof.

FIG. 3a is a detailed sectional view showing the method of operation of the magnetic pulley.

FIG. 7 is a side sectional view of the shaker screen of the present invention.

DESCRIPTION OF THE PREFERRED EMBODIMENT

Figure 4:
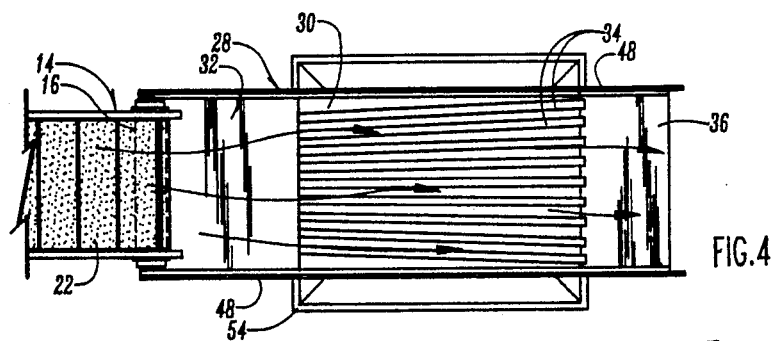
FIG. 4 is a top plan view of the shaker screen of the present invention.

Referring to the drawings, the numeral 10 generally designates the separating system of the present invention. System 10 includes a waste hopper 12 for receiving the recyclable waste materials which are to be separated. Extending upwardly from hopper 12 is a first conveyor 14 which has at its upper end a magnetic roller 16 around which a conveyor belt 22 is trained. Suspended below the first conveyor 14 is a magnetic waste chute 18 which empties into a magnetic waste bin 20. As illustrated in FIG. 3a, the magnetic responsive metals 24, such as tin cans and the like, are held to the belt 22 by the magnetic roller 16 as the belt passes around the roller 16. This causes the cans 24 to be carried completely around the end of the conveyor and to begin moving backward below the conveyor in the direction from which they came. When they pass out of the influence of the magnetic roller 16, they fall into the magnetic waste chute 18 and then downwardly into the magnetic waste bin 20.

The remaining materials which are not responsive to the magnetic roller 16 are identified by the numeral 26 in FIG. 3a. These materials are discharged off the end of the conveyor 22 and are passed onward to the screen separator 28. These nonmagnetic waste materials 26 include such things as aluminum cans, glass, and plastic materials.

Figure 5:
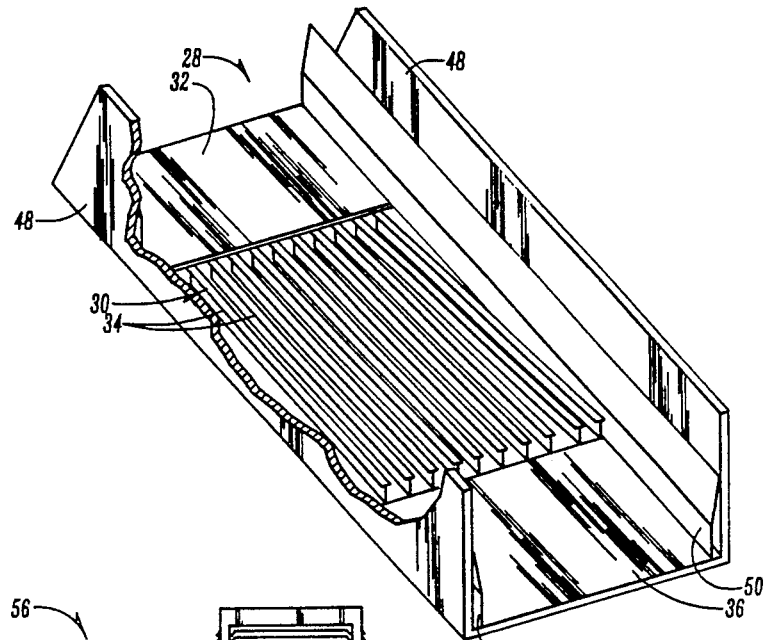
FIG. 5 is a perspective view thereof.
Figure 6:
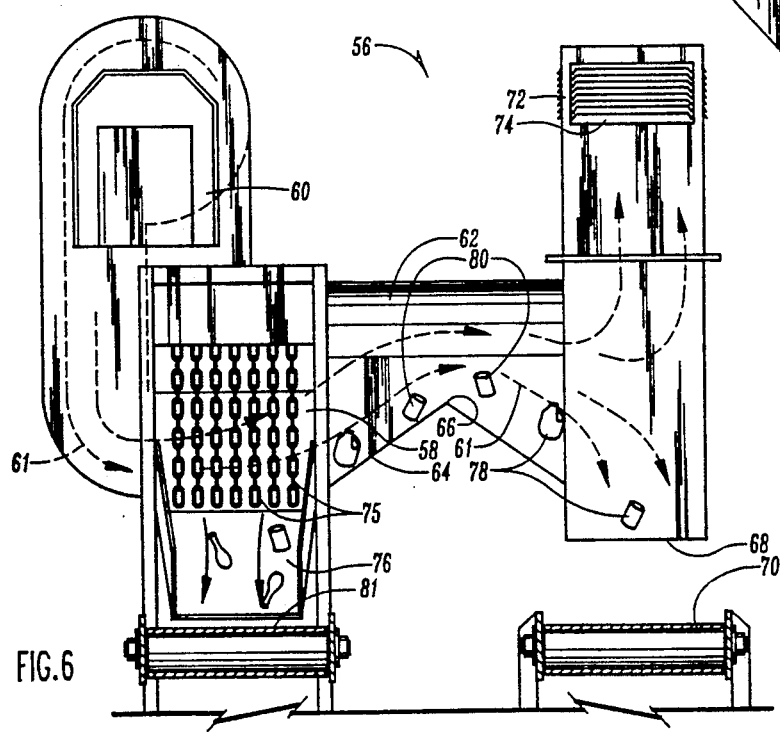
FIG. 6 is a side view of the air separator of the present invention.

Screen separator 28 includes an inclined screen bed 30 (FIG. 7) comprised of an upper slide plate 32, a plurality of T-shaped screen bars 34, and a lower plate 36. A vibrator 38 which is operated by a vibrator motor 40 is connected to a bed frame 42 at the upper pivot 44. Bed frame 42 also includes a lower pivot point 46 to which it is pivoted to the support frame 47. The motor 40 causes the vibrator 38 to vibrate the bed frame 42, thereby causing the T-shaped bars 34 to vibrate. As can be seen in FIGS. 4 and 5, the T-shaped bars 34 are spaced apart a wider distance adjacent their lower ends than they are adjacent their upper ends. Furthermore, the upper ends of bars 34 are positioned below the surface of upper slide plate 32 and rest upon the upper surface of lower slide plate 36. This permits the waste materials to slide down the bars 34 without becoming caught upon any projecting surfaces. The wider spacing of the bars 34 adjacent their lower ends also ensures that small particles do not become wedged or caught between the bars 34.

As the waste materials pass over the bars 34, the smaller glass particles fall through the space between the bars leaving only the larger glass particles, such as whole bottles and the like; aluminum materials, such as cans and the like; and the larger plastic objects. Screen separator 28 also includes a pair of sidewalls 48, and a pair of side flaps 50 which are inclined so as to urge the waste materials toward the longitudinal center line of the screen separator. The smaller glass particles fall between the spaces of the bars 34 into the chute 52 which empties into the glass box 54.

The remaining waste materials pass from the screen separator to an air separator 56. Air separator 56 includes an inclined slide 58 (FIG. 3) which receives the materials from the screen separator 28 and which is inclined so as to cause the materials to continue sliding downwardly in the same direction. A blower housing 60 includes a turbine blower (preferred), a squirrel cage blower or other type of blower (not shown) which forces air downwardly in the direction shown by arrows 61 and then across the incline slide 58 into a wind tunnel 62. Tunnel 62 includes a tunnel floor 64 having a hump or peak 66 intermediate its opposite ends and having a discharge opening 68 positioned above a second conveyor 70. A vent stack 72 extends upwardly above discharge opening 68 and includes louvers 74 which permit the air to escape while at the same time permitting the particles of plastic 78 and aluminum 80 to drop downwardly onto conveyor 70 through discharge opening 68.

The air stream from the fan within housing 60 causes the plastic materials 78 and the aluminum materials 80 to be blown across the hump or peak 66 so that they fall downwardly onto the conveyor 70.

The remaining glass particles, however, are not blown away by the air from the fan housing 60, and instead continue sliding downwardly from incline slide 58 to glass chute 76. Dangling chains 75 retard this downward movement to allow all aluminum and plastic to be blown away through tunnel 62 before the glass materials pass downwardly to chute 76. Chains 75 also prevent the aluminum and plastic materials from being blown accidentally onto glass chute 76.

The hump or peak 66 provides an important function, in that it prevents the heavier objects from being blown over onto the second conveyor 70, while at the same time permitting the lighter objects, such as aluminum or plastic, to be carried over the hump 66.

The remaining glass bottles passed downwardly from glass chute 76 onto a third conveyor 81. Conveyor 81 includes a pair of glass separator chutes 82, 84 which are positioned above a pair of glass bins 90, 92. Also a third glass bin 94 is positioned at the discharge end of third conveyor 81.

Similarly, second conveyor 72 includes a pair of separator chutes 86, 88 which are positioned adjacent plastic bins 96, 98. A final bin 100 is positioned adjacent the discharge end of second conveyor 72.

This arrangement of second and third conveyors 72, 81 permits manual sorting of the materials thereon. For example, the various colored glass can be separated into bins 90, 92, and a third color of glass can be negative sorted into bin 94 by permitting it to fall off the end of conveyor 81. Similarly, plastic can be separated into the bins 96, 98, and a third negative sort for aluminum is permitted into bin 100.

The present invention permits a simple and easy separation of the various waste particles into homogenious groups, including magnetic responsive materials (which are deposited in bin 20), small broken glass particles (which are deposited in bin 54), various colored glass bottles (which are deposited in bins 90, 92, 94), and plastic and aluminum containers (which are separated into bins 96, 98, 100). Thus, it can be seen that the device accomplishes at least all of its stated objectives.

I claim:

1. A method for recycling unground waste materials comprising magnetic responsive metals, magnetic non-responsive metals, large glass materials of various shapes and colors, small glass materials, and plastics, said method comprising:

using a first conveyor to move said unground waste materials from a hopper containing said waste materials;

using screen separating means and magnetic separating means positioned downstream from said first conveyor to remove said small glass materials and said magnetic responsive metals respectively from said waste materials moving said plastics, said magnetic non-responsive metals, and said large glass materials to an air separator means without performing any further separating steps after said use of said screen separating means and said magnetic separating means;

using air separator means positioned downstream from both said screen separation means and said magnetic separation means to separate said plastics and said magnetic non-responsive metals from said large glass materials after said use of said screen separating means and said magnetic separating means;

carrying said plastics and said magnetic non-responsive metals away from said air blower means on a second conveyor;

carrying said large glass materials away from said blower means on a third conveyor.

2. A method according to claim 1 and further comprising manually removing at least a first group of some of said plastics and magnetic non-responsive metals from said second conveyor and permitting a second group of said plastics and magnetic non-responsive metals to be deposited by said second conveyor into a first negative sort bin.

3. A method according to claim 2 and further comprising manually removing at least a first group of said large glass materials from said third conveyor and permitting a second group of said large glass materials to be deposited by said third conveyor into a second negative sort bin.

4. A method for recycling unground waste materials comprising magnetic responsive metals, magnetic non-responsive metals, large glass materials of various shapes and colors, small glass materials, and plastics, said method comprising:

placing said unground waste materials in a hopper;

conveying said unground waste materials from said hopper to screen separating means and magnetic separating means;

using said screen separating means and said magnetic separating means to remove said small glass materials and said magnetic responsive metals from said waste materials; conveying said unground waste materials to an air separator means without performing any further separating steps after said screen separating means and said magnetic separating means have removed said small glass materials and said magnetic responsive metals from said waste materials;

using said air separator means to separate said plastics and said magnetic non-responsive metals from said large glass materials after said waste materials have been conveyed to said air separator means;

carrying said plastics and said magnetic non-responsive metals away from said air separator means on a second conveyor;

carrying said large glass materials away from said air separator means on a third conveyor.

* * * * *